United States Patent
Li et al.

(10) Patent No.: US 10,726,236 B2
(45) Date of Patent: Jul. 28, 2020

(54) DISPLAY PANEL, DISPLAY APPARATUS AND METHOD FOR IDENTIFYING FINGERPRINTS

(71) Applicants: BOE Technology Group Co., Ltd., Beijing (CN); Beijing BOE Optoelectronics Technology Co., Ltd., Beijing (CN)

(72) Inventors: Changfeng Li, Beijing (CN); Xue Dong, Beijing (CN); Xiaochuan Chen, Beijing (CN); Haisheng Wang, Beijing (CN); Yingming Liu, Beijing (CN); Xiaoliang Ding, Beijing (CN); Shengji Yang, Beijing (CN); Weijie Zhao, Beijing (CN); Wei Liu, Beijing (CN); Pengpeng Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 293 days.

(21) Appl. No.: 15/745,368

(22) PCT Filed: Jul. 3, 2017

(86) PCT No.: PCT/CN2017/091436
§ 371 (c)(1),
(2) Date: Jan. 16, 2018

(87) PCT Pub. No.: WO2018/076768
PCT Pub. Date: May 3, 2018

(65) Prior Publication Data
US 2019/0012509 A1    Jan. 10, 2019

(30) Foreign Application Priority Data

Oct. 28, 2016   (CN) .......................... 2016 1 0972558

(51) Int. Cl.
*G06K 9/00* (2006.01)
*G09G 3/3208* (2016.01)

(52) U.S. Cl.
CPC ....... *G06K 9/0004* (2013.01); *G06K 9/00087* (2013.01); *G09G 3/3208* (2013.01); *G09G 2354/00* (2013.01); *G09G 2360/14* (2013.01)

(58) Field of Classification Search
None
See application file for complete search history.

(56) References Cited

U.S. PATENT DOCUMENTS

| 2011/0221945 A1* | 9/2011 | Kurokawa | G06F 3/0412 348/300 |
| 2014/0114607 A1* | 4/2014 | Chang | G06F 3/0416 702/150 |

(Continued)

FOREIGN PATENT DOCUMENTS

| CN | 105095855 A | 11/2015 |
| CN | 105528592 A | 4/2016 |

(Continued)

OTHER PUBLICATIONS

English translation of International Search Report and Written Opinion for International Application No. PCT/CN2017/091436, dated Sep. 28, 2017, 14 pages.
International Search Report and Written Opinion for International Application No. PCT/CN2017/091436, dated Sep. 28, 2017, 14 pages.

*Primary Examiner* — Matthew C Bella
*Assistant Examiner* — Brian D Shin
(74) *Attorney, Agent, or Firm* — Westman, Champlin & Koehler, P.A.

(57) ABSTRACT

Embodiments of the present disclosure provide a display panel, a display apparatus and a method for identifying fingerprints. The display panel comprises a first number of pixel units, arranged in a first direction and a second (Continued)

direction perpendicular to the first direction, and each pixel unit comprises a display element and a sensor configured to sense and identify a fingerprint. The display panel may further comprise a receiving unit, configured to receive a fingerprint signal sensed by the sensor; a controlling unit, configured to control the receiving unit to receive the fingerprint signal sensed by a second number of sensors among a first number of sensors, in response to an instruction for fingerprint identification being received, wherein any two of the second number of sensors are not adjacent to each other in the first direction and the second direction.

15 Claims, 4 Drawing Sheets

(56) References Cited

U.S. PATENT DOCUMENTS

| | | | |
|---|---|---|---|
| 2014/0219521 A1* | 8/2014 | Schmitt | G06K 9/00201 |
| | | | 382/124 |
| 2017/0140194 A1 | 5/2017 | Qin et al. | |
| 2017/0161540 A1* | 6/2017 | Mienko | G06F 3/0421 |

FOREIGN PATENT DOCUMENTS

| | | |
|---|---|---|
| CN | 105930827 A | 9/2016 |
| CN | 106022292 A | 10/2016 |
| CN | 106529463 A | 3/2017 |
| KR | 10-2016-0056388 A | 5/2016 |

\* cited by examiner

DISPLAY PANEL, DISPLAY APPARATUS AND METHOD FOR IDENTIFYING FINGERPRINTS

CROSS-REFERENCE TO RELATED APPLICATION(S)

This application a Section 371 National Stage Application of International Application No. PCT/CN2017/091436, filed Jul. 3, 2017, which is not yet published, and claims the priority of Chinese Patent Application No. 201610972558.5, filed on Oct. 28, 2016, the entire contents of which are hereby incorporated by reference.

TECHNICAL FIELD

Embodiments of the present disclosure relate to the field of fingerprint identification technologies, and in particular, to a display panel, a display apparatus, and a method for identifying fingerprints.

BACKGROUND

Silicon-based OLED (Organic Light-Emitting Diode) microdisplay devices can effectively increase PPI (pixels per inch), but also cause problems for fingerprint identification based on silicon-based OLEDs. For example, since the PPI of an OLED pixel fabricated on a silicon substrate is very high and the density of the sensors is relatively large, an increased scanning frequency may be resulted. However, the number of touch points is limited, thus data unrelated to the touch signal may be collected. In addition, due to the high density of pixel units, the distance between the receiving lines is very small, which is prone to produce crosstalk. In addition, due to the small spacing between the sensors in adjacent pixel units, the light reflected by the ridge of the fingerprint will not only illuminate the sensor corresponding to the fingerprint pressing point, but also the sensor adjacent to the fingerprint pressing point, resulting in a distortion of light actually reflected by the fingerprint, and even generating an erroneous touch signal.

SUMMARY

In order to at least solve the above technical problems partially, embodiments of the present disclosure may provide a display panel, a display apparatus and a method for identifying fingerprints.

According to an aspect of embodiments of the present disclosure, a display panel of identifying fingerprints may be provided, wherein the display panel may comprises a first number of pixel units arranged in a first direction and a second direction intersected with the first direction, and each pixel unit comprises a display element and a sensor configured to sense a fingerprint, wherein the second number is less than the first number. The display panel may further comprise:

a receiving circuit, configured to receive a fingerprint signal sensed by the sensor;

a controller, configured to control the receiving circuit to receive the fingerprint signal sensed by a second number of sensors among a first number of sensors, in response to an instruction for fingerprint identification being received, wherein any two of the second number of sensors are not adjacent to each other in the first direction and the second direction.

For example, the display panel may further comprise:

M scanning lines, connected to the sensors in M rows of pixel units respectively and the M scanning lines configured to transmit a driving signal to the sensors, wherein the receiving circuit comprises:

N receiving lines, connected to the sensors in N columns of pixel units respectively and the N receiving lines configured to receive the fingerprint signal sensed by the sensors, wherein M and N are both integers greater than 1.

For example, the controller may be configured to control the M scanning lines to transmit the driving signal to the sensors in rows one by one, in response to the instruction for fingerprint identification being received, and to control the $n^{th}$, $(n+b)^{th}$, $(n+2b)^{th}$, ..., $(n+q*b)^{th}$ of the N receiving lines to receive the fingerprint signal sensed by the sensors in the corresponding row, when the $m^{th}$, $(m+a)^{th}$, $(m+2a)^{th}$, ..., $(m+p*a)^{th}$ of the M scanning lines are transmitting the driving signal to the sensors in a corresponding row, wherein m, n, a, b, p and q are positive integers, and a≥2, b≥2, m≥1, n≥1, p≥0, q≥0, m+p*a≤M and n+q*b≤N.

For example, the controller may be configured to control the $m^{th}$, $(m+a)^{th}$, $(m+2a)^{th}$, ..., $(m+p*a)^{th}$ of the M scanning lines to transmit the driving signal to the sensors in a corresponding row one by one, in response to the instruction for fingerprint identification being received.

For example, the controller may be configured to control the M scanning lines to transmit the driving signal to the sensors in a corresponding row one by one, in response to the instruction for fingerprint identification being received, wherein the controller is further configured to:

control the even-numbered receiving lines among the N receiving lines to receive the fingerprint signal sensed by the sensors in the corresponding row, when the odd-numbered scanning lines among the M scanning lines transmit the driving signal to the sensors in the corresponding row, and control the odd-numbered receiving lines among the N receiving lines to receive the fingerprint signal sensed by the sensors in the corresponding row, when the even-numbered scanning lines among the M scanning lines transmit the driving signal to the sensors in the corresponding row.

For example, the odd-numbered receiving lines among the N receiving lines may be controlled to receive the fingerprint signal sensed by the sensors in the corresponding row, when the odd-numbered scanning lines among the M scanning lines transmit the driving signal to the sensors in the corresponding row, and the even-numbered receiving lines among the N receiving lines may be controlled to receive the fingerprint signal sensed by the sensors in the corresponding row, when the even-numbered scanning lines among the M scanning lines transmit the driving signal to the sensors in the corresponding row.

For example, the sensor may be a photoelectric sensor, and the photoelectric sensor is configured to receive an incident light after the light being reflected by the ridge of a finger, and to determine the fingerprint information of the finger according to the intensity of the reflected light.

For example, the photoelectric sensor may comprise:

a N-well on a silicon substrate;

wherein N+ and P+ are disposed on the N-well.

For example, the silicon substrate may be a substrate doped with P-type silicon.

For example, the photoelectric sensor may be connected with a switching unit in series.

According to another aspect of embodiments of the present disclosure, a display apparatus comprising the display panel according to the embodiments of the present disclosure may be provided.

According to yet another aspect of embodiments of the present disclosure, a method of identifying fingerprints in the display panel according to the embodiments of the present disclosure, the method comprising:

receiving the fingerprint signal sensed by the second number of sensors among the first number of sensors, wherein any two of the second number of sensors are not adjacent in the first direction and the second direction.

For example, the receiving of the fingerprint signal sensed by the second number of sensors in a first number of sensors may comprise:

controlling the M scanning lines to transmit the driving signals to the sensors in rows one by one, and controlling the $n^{th}$, $(n+b)^{th}$, $(n+2b)^{th}$, ..., $(n+q*b)^{th}$ of the N receiving lines to receive the fingerprint signal sensed by the sensors in the corresponding row, when the $m^{th}$, $(m+a)^{th}$, $(m+2a)^{th}$, ..., $(m+p*a)^{th}$ of the M scanning lines are transmitting the driving signal to the sensors in a corresponding row, where m, n, a, b, p and q are positive integers, and $a \geq 2$, $b \geq 2$, $m \geq 1$, $n \geq 1$, $p \geq 0$, $q \geq 0$, $m+p*a \leq M$ and $n+q*b \leq N$.

For example, the receiving of the fingerprint signal sensed by the second number of sensors among the first number of sensors may comprise:

controlling the $m^{th}$, $(m+a)^{th}$, $(m+2a)^{th}$, ..., $(m+p*a)^{th}$ of the M scanning lines to transmit the driving signals to the sensors in the corresponding rows one by one.

For example, the receiving of the fingerprint signal sensed by the second number of sensors among the first number of sensors may comprise:

controlling the M scanning lines to transmit the driving signals to the sensors in the corresponding rows one by one, controlling the even-numbered receiving lines among the N receiving lines to receive the fingerprint signal sensed by the sensors in the corresponding row, when the odd-numbered scanning lines among the M scanning lines transmit the driving signal to the sensors in the corresponding row, and controlling the odd-numbered receiving lines among the N receiving lines to receive the fingerprint signal sensed by the sensors in the corresponding row, when the even-numbered scanning lines among the M scanning lines transmit the driving signal to the sensors in the corresponding row.

For example, the odd-numbered receiving lines among the N receiving lines may be controlled to receive the fingerprint signal sensed by the sensors in the corresponding row, when the odd-numbered scanning lines among the M scanning lines transmit the driving signal to the sensors in the corresponding row, and the even-numbered receiving lines among the N receiving lines may be controlled to receive the fingerprint signal sensed by the sensors in the corresponding row, when the even-numbered scanning lines among the M scanning lines transmit the driving signal to the sensors in the corresponding row.

BRIEF DESCRIPTION OF THE DRAWINGS

To describe the technical solutions of the embodiments of the present disclosure or in the conventional art more clearly, the accompanying drawings required for describing the embodiments or the conventional art will be briefly introduced hereinafter. Apparently, the accompanying drawings in the following description only illustrate some embodiments of the present invention, and those skilled in the art may derive other embodiments from these accompanying drawings without creative efforts.

DETAILED DESCRIPTION

To make the objectives, technical solutions, and advantages of the embodiments of the present disclosure more comprehensible, the technical solutions in the embodiments of the present disclosure will be described clearly and completely below with reference to the accompanying drawings in the embodiments of the present disclosure. Obviously, the described embodiments are only a part but not all of the embodiments of the present disclosure. All other embodiments obtained by persons skilled in the art based on the described embodiments of the present disclosure without creative efforts shall also fall within the scope of the present disclosure.

Figure 1:
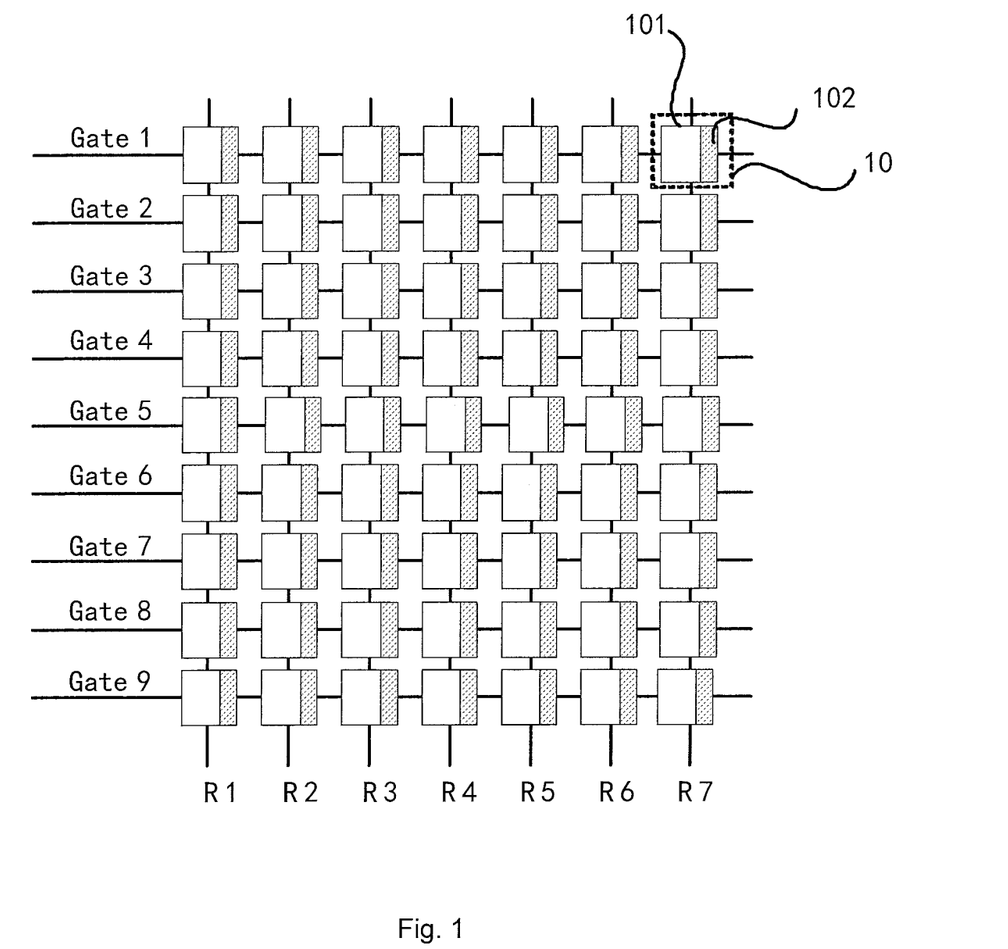
FIG. 1 shows a schematic structural diagram of a conventional display

FIG. 1 shows a schematic structural diagram of a conventional display panel. As shown in FIG. 1, the display panel may include a first number of pixel units 10 arranged in a first direction and a second direction intersected with the first direction, and each pixel unit 10 comprises a display element 101 and a sensor 102 disposed on the silicon substrate, wherein the sensor 102 is configured to sense a fingerprint signal. When fingerprint identification is implemented by using the conventional display panel shown in FIG. 1, the scanning signals are input into the scanning lines Gate1 to Gate9 line by line, so that the pixels in the corresponding row are turned on row by row. Receiving lines R1 to R7 may scan simultaneously or column by column, so as to collect data from all sensors. The traditional technical solution shown in FIG. 1 has some problems when it is scanned. First of all, since the PPI of an OLED pixel fabricated on the silicon substrate is very high and the density of the sensor is relatively large, an increased scanning frequency may be resulted. However, the number of touch points is limited, thus data unrelated to the touch signal may be collected. In addition, due to the high density of pixel units, the distance between the receiving lines is very small, which is prone to produce crosstalk. In addition, due to the small spacing between the sensors in adjacent pixel units, the light reflected by the ridge of the fingerprint will not only illuminate the sensor corresponding to the fingerprint pressing point, but also the sensor adjacent to the fingerprint pressing point, resulting in a distortion of light actually reflected by the fingerprint, and even generating an erroneous touch signal.

Figure 2A:
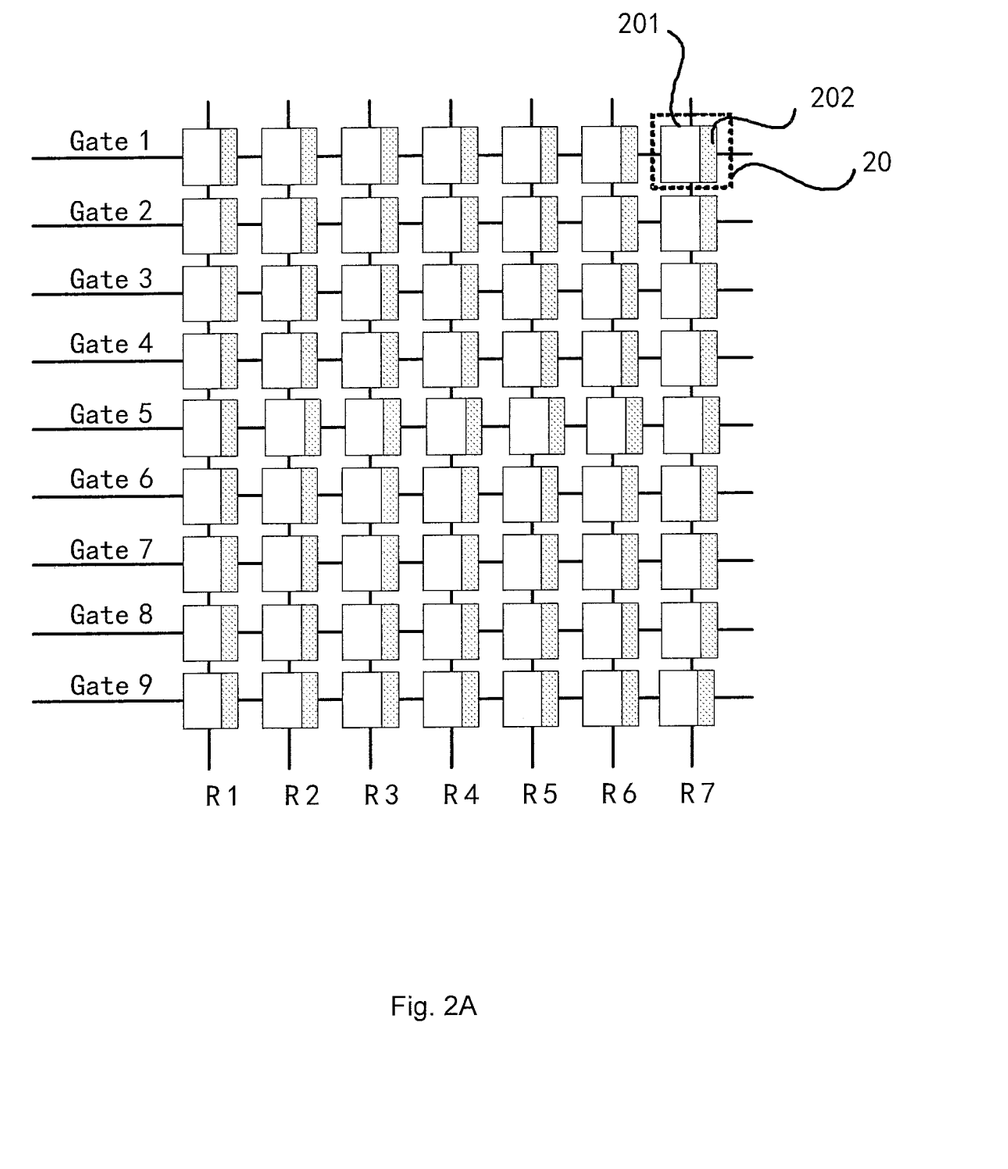
FIG. 2A shows a schematic planar diagram of a display panel according to an embodiment of the present disclosure.

FIG. 2A shows a schematic planar diagram of a display panel according to an embodiment of the present disclosure. As shown in FIG. 2A, a display panel according to an embodiment of the present disclosure may include a first number of pixel units 20 arranged in a first direction and a second direction intersected with the first direction, and each pixel unit 20 comprises a display element 201 and a sensor 202, the sensor 202 being configured to sense and/or identify a fingerprint signal. The display panel further includes: M scanning lines Gate1, Gate2, . . . Gate7, connected to the sensors in M rows of pixel units respectively and configured to transmit a driving signal to the sensors. The display panel further comprises a receiving circuit. The receiving circuit comprises: N receiving lines R1, R2, . . . R7, connected to the sensors 202 in N columns of pixel units 20 respectively and configured to receive the fingerprint signal sensed by the sensors, wherein M and N are both integers greater than 1. For example, the first direction may be a direction in which the scanning lines Gate1, Gate2, . . . , Gate7 extend, and the second direction may be a direction in which the receiving lines R1, R2, . . . , R7 extend. The display panel further comprises a controller. The controller configured to control the receiving circuit to receive the fingerprint signal sensed by a second number of sensors among the first number of sensors, in response to an instruction for fingerprint identification being received. The second number may be an integer less than the first number. An arrangement of any two of the sensors whose signals are received being not adjacent to each other in the first direction and the second direction is achieved by controlling a plurality of non-adjacent receiving lines that need to receive signals to be turned on and/or grounding a plurality of non-adjacent receiving lines that do not need to receive signals via the controller, when the scanning lines are transmitting driving signals to the sensors. For example, the receiving line can be implemented by data lines of the display panel. According to the present disclosure, the term "the sensors being not adjacent to each other" indicates the sensors are spaced by at least one pixel unit, and the term "the not adjacent receiving lines" indicates the receiving lines are spaced by at least one receiving line.

Figure 2B:
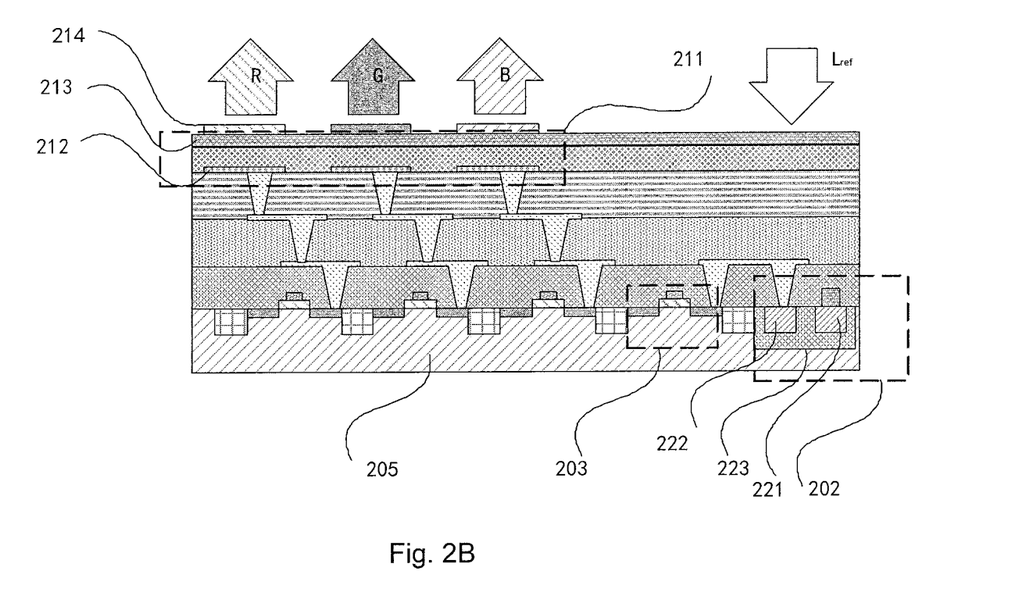
FIG. 2B shows a schematic cross-sectional diagram of a display panel according to an embodiment of the present disclosure.

FIG. 2B shows a schematic cross-sectional diagram of the display panel of FIG. 2A. As shown in FIG. 2B, the pixel unit 20 may comprise: a silicon substrate 205; and a display element 201 and a sensor 202 formed on the silicon substrate 205. The sensor 202 is preferably a photoelectric sensor. A light emitting unit 211 is further disposed on the silicon substrate 205. The light emitted by the light emitting unit 211 is incident on the photoelectric sensor 202 after being reflected by the ridge of a finger. The photoelectric sensor may determine the fingerprint information of the finger based on the intensity of the reflected light $L_{ref}$. Certainly, the light emitted by other light sources may be also incident on the photoelectric sensor after being reflected by the ridge of the finger. The photoelectric sensor may determine texture information of the finger according to the intensity of the reflected light.

The silicon substrate 5 is, for example, a substrate doped with P-type silicon. The photoelectric sensor 202 may include an N-well on the silicon substrate 5; wherein N+ and P+ are disposed on the N-well. The photoelectric sensor 202 is composed of the silicon substrate 205 doped with P-type silicon, the N-well on the silicon substrate 205 and N+ and P+ disposed on the N-well constitute.

For example, the light emitting unit 211 may be a silicon-based OLED. The light-emitting unit 211 includes an anode 212 and a cathode 213. There is a luminescent material disposed between the anode 212 and the cathode 213. The anode is connected to a lighting controlling circuit. A color filter substrate 214 is also disposed above the light-emitting unit. The light emitted by the light-emitting unit 211 passes through the color filter substrate and then is filtered into light with different colors to exit. The light emitted by the light-emitting unit 211 may have different intensities due to the difference of the ridge of the fingers, and the light reflected by the ridges of the finger may be directed toward the photoelectric sensor. After that, the photoelectric sensor may generate different photocurrents depending on different intensities of the light reflected by the ridge of the fingers, so as to determine the finger's fingerprint information.

Figure 3:
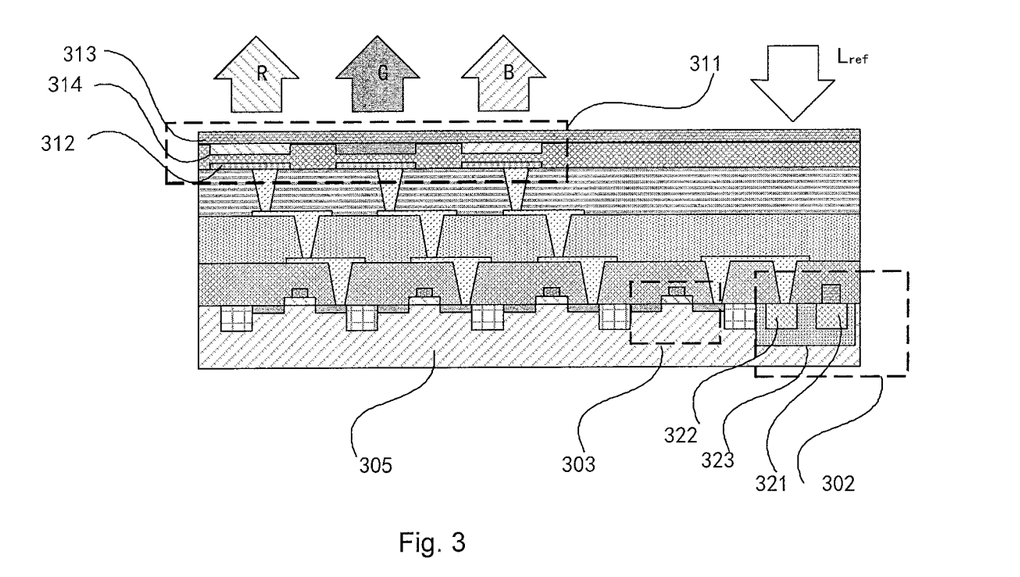
FIG. 3 shows a schematic cross-sectional diagram of a display panel according to another embodiment of the present disclosure.

FIG. 3 shows a schematic cross-sectional diagram of a display panel according to another embodiment of the present disclosure. As shown in FIG. 3, the light emitting unit 311 may be a color light emitting unit. For example, the color filter substrate may be disposed in the light emitting unit 301, wherein the light emitting unit is preferably an OLED. The light-emitting unit 301 includes the anode 312 and the cathode 313. The luminescent material is disposed between the anode 312 and the cathode 313. The color filter substrate 314 is disposed between the light emitting material and the cathode 313. The anode 312 is connected to the light emitting control circuit.

In order to better control the turning on and off of each fingerprint identification device, the photoelectric sensor may be connected in series with the switching unit 203 or 303. For example, the switching unit is a MOS switch which can be arranged on the silicon substrate.

Next, a display panel according to the embodiment of the present disclosure and a method for identifying fingerprints using the same will be described in detail with reference to FIGS. 2A, 2B, and 3.

As shown in FIG. 2A, the controller may be configured to control the M scanning lines to transmit the driving signal to the sensors in rows one by one, in response to the instruction for fingerprint identification being received, and to control the $n^{th}$, $(n+b)^{th}$, $(n+2b)^{th}$, . . . , $(n+q*b)^{th}$ of the N receiving lines to receive the fingerprint signal sensed by the sensors in a corresponding row, when the $m^{th}$, $(m+a)^{th}$, $(m+2a)^{th}$, . . . , $(m+p*a)^{th}$ of the M scanning lines are transmitting the driving signal to the sensors in the corresponding row, wherein m, n, a, b, p and q are positive integers, and $a≥2$, $b≥2$, $m≥1$, $n≥1$, $p≥0$, $q≥0$, $m+p*a≤M$ and $n+q*b≤N$. According to this embodiment, since $a≥2$ and $m≥1$, even when m equals to the minimum value 1 and a equals to the minimum value 2 (that is, when the odd-numbered scanning lines (such as, the first scanning line, third scanning line, fifth scanning line, . . . ) are transmitting the driving signal to the sensors in the odd-numbered receiving lines, the receiving lines receive the signals sensed by the sensors), it is ensured that the sensors whose signals are received are not adjacent to each other in a direction of receiving lines. Since $b≥2$ and $n≥1$, even when n equals to the minimum value 1 and b equals to the minimum value 2 (that is, when the scanning lines are transmitting driving signals to the sensors, the odd-numbered receiving lines (such as, the first receiving line, third receiving line, fifth receiving line, . . . ) are receiving the sensed signal from the sensors), it is ensured that the sensors whose signals are received are not adjacent to each other in a direction of scanning lines. According to the embodiment of the present disclosure, among the second number of sensors, the two closest sensors are also separated by at least one row or one column. Crosstalk between received fingerprint signals can be reduced substantially. In addition, the light reflected from the ridge of the fingerprint to a sensor is not easily incident on other sensors separated by a row or a column, so that the accuracy of the received fingerprint signal can be improved.

When the instruction for fingerprint identification is received, the controller may be configured to control the $m^{th}$, $(m+a)^{th}$, $(m+2a)^{th}$, . . . , $(m+p*a)^{th}$ of the M scanning lines to transmit the driving signal to the sensors in a corresponding row one by one, in response to the instruction for fingerprint identification being received. Since the receiving signal only receives signals when the $m^{th}$, $(m+a)^{th}$, $(m+2a)^{th}$, ..., $(m+p*a)^{th}$ of the M scanning lines are transmitting driving signal to the sensors in the corresponding row, i.e., the receiving lines do not receive signal when other scanning lines of the M scanning lines are transmitting driving signal to the sensors in the corresponding row, it is not necessary to control other scanning lines to transmit the driving signal when the instruction for fingerprint identification is received. When the instruction for fingerprint identification is received, only the $m^{th}$, $(m+a)^{th}$, $(m+2a)^{th}$, ..., $(m+p*a)^{th}$ of the M scanning lines can be controlled to transmit the driving signals to the sensors in the corresponding row, so as to reduce the scanning frequency. In addition, since the sensors in the corresponding rows with an interval of a are turned on, the crosstalk between the sensors in a direction of receiving lines can be reduced.

Figure 4:
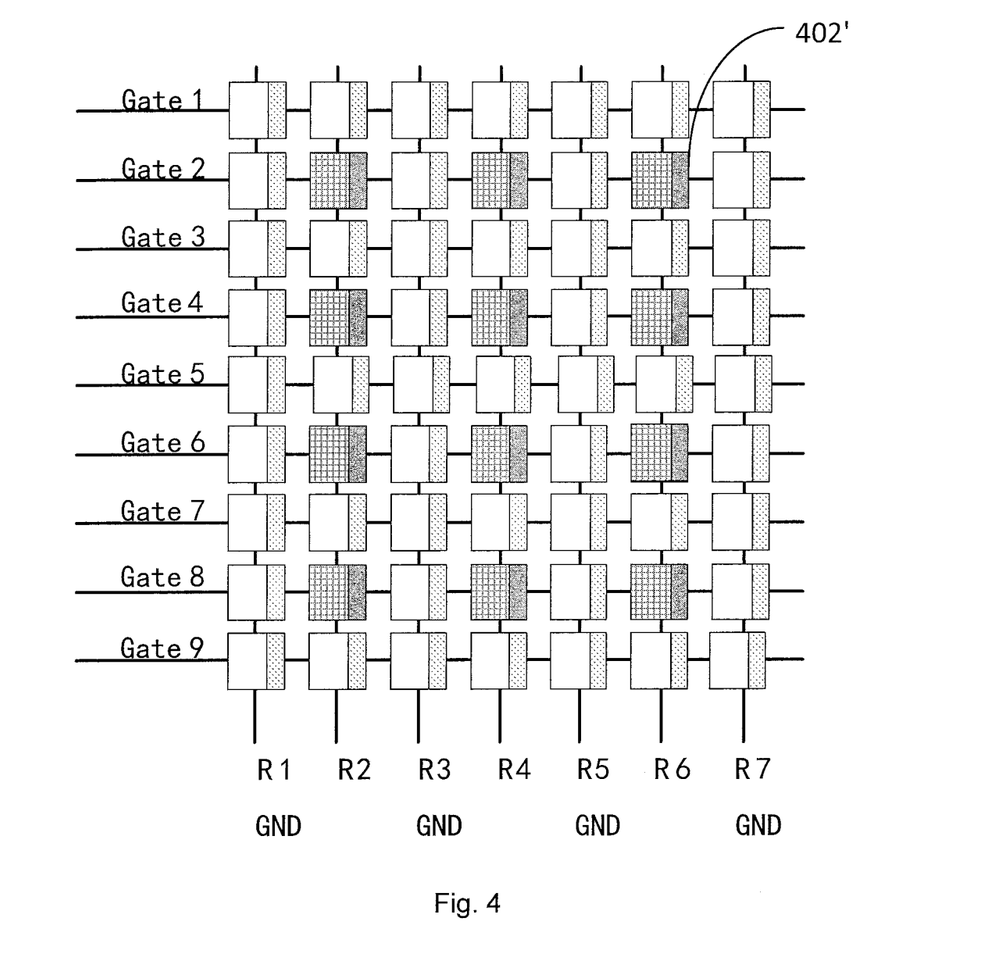
FIG. 4 shows a schematic structural diagram of a display panel according to another embodiment of the present disclosure.

The controller may be configured to control the M scanning lines to transmit the driving signal to the sensors in a corresponding row one by one, in response to the instruction for fingerprint identification being received. In particular, the controller is configured to control the even-numbered receiving lines among the N receiving lines to receive the fingerprint signal sensed by the sensors in the corresponding row, when the odd-numbered scanning lines among the M scanning lines transmit the driving signal to the sensors in the corresponding row, and control the odd-numbered receiving lines among the N receiving lines to receive the fingerprint signal sensed by the sensors in the corresponding row, when the even-numbered scanning lines among the M scanning lines transmit the driving signal to the sensors in the corresponding row. Alternatively, the controller may be configured to control the odd-numbered receiving lines among the N receiving lines to receive the fingerprint signal sensed by the sensors in the corresponding row, when the odd-numbered scanning lines among the M scanning lines transmit the driving signal to the sensors in the corresponding row, and control the even-numbered receiving lines among the N receiving lines to receive the fingerprint signal sensed by the sensors in the corresponding row, when the even-numbered scanning lines among the M scanning lines transmit the driving signal to the sensors in the corresponding row. As shown in FIG. 4, according to the embodiment of the present disclosure, for the sensor 402' whose signal is received, its closest sensor is separated by one pixel unit in the direction of the scanning line and the data line. In the diagonal direction, there are directly adjacent sensors. However, since the pixel units are arranged in a matrix, the spacing between adjacent pixel units in the same row or in the same column is smaller than the spacing between adjacent pixel units in the diagonal direction. Therefore, according to the present embodiment, it is possible to avoid the light reflected by the ridge of the finger from being irradiated onto the two adjacent sensors, thereby improving the accuracy of the received fingerprint signal, increasing the number of sensors whose signal are received, and improving the accuracy of fingerprint identification.

An embodiment of the present disclosure further provides a display apparatus comprising the display panel discussed above. The display device provided in the embodiments of the present disclosure may be any product or component having a display function, such as a laptop, a liquid crystal display, a liquid crystal television, a digital photo frame, a cell phone, a tablet and the like.

An embodiment of the present disclosure further provides a method for identifying fingerprints, which can be applied to the display panel discussed above. The method includes receiving the fingerprint signal sensed by the second number of sensors among the first number of sensors, wherein any two of the second number of sensors are not adjacent in the first direction and the second direction. The method for identifying fingerprints according to the embodiment of the present disclosure is described in detail with reference to FIG. 2A, FIG. 2B, and FIG. 3.

The display panel according to the embodiment of the present disclosure may include M scanning lines connected to the sensors in M rows of pixel units respectively and configured to transmit a driving signal to the sensors; and N receiving lines connected to the sensors in N columns of pixel units respectively and configured to receive the fingerprint signal sensed by the sensors, wherein M and N are both integers greater than 1. The first direction may be a direction in which the scanning lines Gate1, Gate2, ... Gate7 extend, and the second direction may be a direction in which the receiving lines R1, R2, ... R7 extend. The arrangement of any two of the sensors whose signals are received being not adjacent to each other in the first direction and the second direction is achieved by controlling a plurality of non-adjacent receiving lines that need to receive signals to be turned on and/or grounding a plurality of non-adjacent receiving lines that do not need to receive signals via the controller, when the scanning lines are transmitting driving signals to the sensors.

The receiving of a fingerprint signal sensed by a second number of sensors in a first number of sensors may comprise: controlling the M scanning lines to transmit the driving signals to the sensors in the corresponding row one by one, and controlling the $n^{th}$, $(n+b)^{th}$, $(n+2b)^{th}$, ..., $(n+q*b)^{th}$ of the N receiving lines to receive the fingerprint signal sensed by the sensors in the corresponding row, when the $m^{th}$, $(m+a)^{th}$, $(m+2a)^{th}$, ..., $(m+p*a)^{th}$ of the M scanning lines are transmitting the driving signal to the sensors in the corresponding row, where m, n, a, b, p and q are positive integers, and $a \geq 2$, $b \geq 2$, $m \geq 1$, $n \geq 1$, $p \geq 0$, $q \geq 0$, $m+p*a \leq M$ and $n+q*b \leq N$. Since $a \geq 2$ and $m \geq 1$, even when m equals to the minimum value 1 and a equals to the minimum value 2 (that is, when the odd-numbered scanning lines (such as, the first scanning line, third scanning line, fifth scanning line, ...) are transmitting the driving signal to the sensors in the odd-numbered receiving lines, the receiving lines receive the signals sensed by the sensors), it is ensured that the sensors whose signals are received are not adjacent to each other in a direction of receiving lines. In addition, since $b \geq 2$ and $n \geq 1$, even when n equals to the minimum value 1 and b equals to the minimum value 2 (that is, when the scanning lines are transmitting driving signals to the sensors, the odd-numbered receiving lines (such as, the first receiving line, third receiving line, fifth receiving line, ...) are receiving the sensed signal from the sensors), it is ensured that the sensors whose signals are received are not adjacent to each other in a direction of scanning lines. According to the embodiment of the present disclosure, among the second number of sensors, the two closest sensors are also separated by at least one row or one column. Crosstalk between received fingerprint signals can be reduced substantially. In addition, the light reflected from the ridge of the fingerprint to a sensor is not easily incident on other sensors separated by a row or a column, so that the accuracy of the received fingerprint signal can be improved.

The receiving of the fingerprint signal sensed by the second number of sensors among the first number of sensors may comprise: controlling the $m^{th}$, $(m+a)^{th}$, $(m+2a)^{th}$, ..., $(m+p*a)^{th}$ of the M scanning lines to transmit the driving signals to the sensors in the corresponding rows one by one.

According to this embodiment, when the instruction for fingerprint identification is received, only the $m^{th}$, $(m+a)^{th}$, $(m+2a)^{th}$, ..., $(m+p*a)^{th}$ of the M scanning lines can be controlled to transmit the driving signals to the sensors in the corresponding row, so as to reduce the scanning frequency. In addition, since the sensors in the corresponding rows with an interval of a are turned on, the crosstalk between the sensors in a direction of receiving lines can be reduced. According to this embodiment of the present disclosure, when the instruction for fingerprint identification is received, only the $m^{th}$, $(m+a)^{th}$, $(m+2a)^{th}$, ..., $(m+p*a)^{th}$ of the M scanning lines can be controlled to transmit the driving signals to the sensors in the corresponding row, so as to reduce the scanning frequency. In addition, since the sensors in the corresponding rows with an interval of a are turned on, the crosstalk between the sensors in a direction of receiving lines can be reduced.

According to the embodiment of the disclosure, the receiving of the fingerprint signal sensed by the second number of sensors among the first number of sensors may comprise: controlling the M scanning lines to transmit the driving signal to the sensors in a corresponding row one by one, in response to the instruction for fingerprint identification being received. In particular, the method comprises controlling the even-numbered receiving lines among the N receiving lines to receive the fingerprint signal sensed by the sensors in the corresponding row, when the odd-numbered scanning lines among the M scanning lines transmit the driving signal to the sensors in the corresponding row, and controlling the odd-numbered receiving lines among the N receiving lines to receive the fingerprint signal sensed by the sensors in the corresponding row, when the even-numbered scanning lines among the M scanning lines transmit the driving signal to the sensors in the corresponding row. Alternatively, the method may comprise controlling the odd-numbered receiving lines among the N receiving lines to receive the fingerprint signal sensed by the sensors in the corresponding row, when the odd-numbered scanning lines among the M scanning lines transmit the driving signal to the sensors in the corresponding row, and controlling the even-numbered receiving lines among the N receiving lines to receive the fingerprint signal sensed by the sensors in the corresponding row, when the even-numbered scanning lines among the M scanning lines transmit the driving signal to the sensors in the corresponding row. According to the embodiment of the present disclosure, for the sensor whose signal is received, its closest sensor is separated by one pixel unit in the direction of the scanning line and the data line. In the diagonal direction, there are directly adjacent sensors. However, since the pixel units are arranged in a matrix, the spacing between adjacent pixel units in the same row or in the same column is smaller than the spacing between adjacent pixel units in the diagonal direction. Therefore, according to the present embodiment of the disclosure, it is possible to avoid the light reflected by the ridge of the finger from being irradiated onto the two adjacent sensors, thereby improving the accuracy of the received fingerprint signal, increasing the number of sensors whose signal are received, and improving the accuracy of fingerprint identification.

According to the display panel, the display apparatus and the method for identifying fingerprints according to the embodiments of the present disclosure, any two of the sensors corresponding to the received fingerprint signal are not adjacent in the first direction and the second direction of the matrix. That is, the received fingerprint signal are originated from non-adjacent sensors. Thus, the crosstalk between the received fingerprint signal can be reduced, and fingerprints can be more accurately identified from the received fingerprint signal.

Those skilled in the art should understand that the embodiments of the present application may be provided as a method, a system, or a computer program product. Accordingly, the present application may take a form of an entirely hardware embodiment, an entirely software embodiment, or an embodiment combining software and hardware. Moreover, the present application may take a form of a computer program product embodied on one or more computer available storage media containing a computer available program code, including but not limited to, a magnetic disk storage, a CD-ROMs, an optical storage and the like.

This disclosure is described with reference to the flowchart and/or the block diagram of a method, an apparatus (system), and a computer program product according to the embodiments of the present application. It should be understood that each flow and/or block in the flowcharts and/or block diagrams, and a combinations thereof may be implemented by computer program instructions. These computer program instructions may be provided to a processor of a general purpose computer, a dedicated computer, an embedded processor, or other programmable data processing apparatus to produce a machine, such that the instructions executed by the processor of the computer or other programmable data processing apparatus may constitute means for implementing the functions specified in one or more flows in the flowchart and/or one or more blocks in the block diagrams.

These computer program instructions may also be stored in a computer readable memory that can direct a computer or other programmable data processing apparatus to function in a particular manner such that the instructions stored in the computer readable memory produce an article of manufacture including instruction means which may implement the functions specified in one or more flows in the flowchart and/or one or more blocks in the block diagrams.

These computer program instructions may also be loaded onto a computer or other programmable data processing apparatus to cause a series of operating steps to be performed on the computer or other programmable apparatus, so as to produce a computer-implemented processes, so that the instructions executed on the computer or other programmable apparatus may provide steps for implementing the functions specified in one or more flows in the flowchart and/or one or more blocks in the block diagrams.

It should be noted that, in this document, relational terms such as first and second are merely used to distinguish one entity or operation from another entity or operation, and do not necessarily require or imply that there is any actual relationship or order between the entities or operations. Moreover, the terms "include", "comprise" or any other variations thereof are intended to cover a non-exclusive inclusion such that a process, method, article, or apparatus that includes a series of elements includes not only those listed elements but also include other elements that are not listed explicitly, and elements which are inherent to such process, method, article, or apparatus. Without further limitations, an element limited by the expression "including a . . . " does not exclude the existence of additional identical elements in the process, method, article, or apparatus that includes the element. The orientation or positional relation defined by the terms "up", "down", and the like which is based on the orientation or positional relationship shown in the drawings, is merely provided for describing the present disclosure and simplifying the description, rather than indicating or implying that the intended apparatus or element must have an specific orientation, or be configured and operated in a specific orientation. Thus, the terms cannot be understood as a limitation of the present disclosure. The terms "mounted", "connected" and "connected" should be interpreted broadly, unless expressly stated and limited otherwise. For example, the elements may be connected fixedly, removably or integrally. may be connected mechanically or electrically; or may be connected directly or via an intermediate element. Further, the connection may be also referred to a conduction between two elements. For those skilled in the art, the specific meanings of the above terms in the present disclosure may be understood based on specific situations.

In the description of the embodiments of the present disclosure, numerous specific details are described. However, it is to be understood that the embodiments of the present disclosure may be practiced without these specific details. In some instances, well-known methods, structures and techniques have not been shown in detail in order to not obscure the understanding of this description. Similarly, it is to be understood that in the foregoing description of exemplary embodiments of the disclosure, various features of the disclosure are sometimes grouped to a single embodiment, a figure, or description thereof, in order to simplify the disclosure and help in the understanding of one or more of the various inventive aspects. However, the method disclosed should not be construed as having a scope greater than the one claimed by the features expressly recited in each claim. More specifically, as claimed by the claims, inventive aspects lie in less than all features of a single foregoing disclosed embodiment. Thus, the claims following the detailed description are hereby expressly incorporated into this detailed description, with each claim standing on its own as a separate embodiment of the present disclosure. It should be noted that the embodiments in the present application and the features in the embodiments may be combined with each other without conflicting. The disclosure is not limited to any single aspect nor to any single embodiment, and not limited to any combination and/or permutation of such aspects and/or embodiments either. Rather, each aspect and/or embodiment of the present disclosure may be used alone or in combination with one or more other aspects and/or embodiments thereof.

The foregoing embodiments are merely illustrative of the technical aspects of the present disclosure and are not intended to be limiting thereof. Although the present disclosure has been described in detail with reference to the foregoing embodiments, it will be understood by those of ordinary skilled in the art that all modifications or modified forms derived based on the technical ideas of the present disclosure are included within the scope of the present invention, without departing from the spirit of the disclosure.

We claim:

1. A method of identifying fingerprints in a display panel, the display panel comprising a first number of pixel units, arranged in a first direction and a second direction intersected with the first direction, and each pixel unit comprises a display element and a sensor configured to sense a fingerprint signal; a receiving circuit configured to receive a fingerprint signal sensed by the sensor; a controller configured to control the receiving circuit to receive the fingerprint signal sensed by a second number of sensors among a first number of sensors, in response to an instruction for fingerprint identification being received, wherein the second number is less than the first number, and M scanning lines, each connected to the sensors in one of M rows of pixel units respectively and M scanning lines configured to transmit a driving signal to the sensors, wherein the receiving circuit comprises: N receiving lines, each connected to the sensors in one of N columns of the pixel units respectively and the N receiving lines configured to receive the fingerprint signal sensed by the sensors, wherein M and N are both integers greater than 1;

the method comprising:
receiving the fingerprint signal sensed by the second number of sensors among the first number of sensors via the N receiving lines,
wherein any two of the second number of sensors are not adjacent in the first direction and the second direction.

2. The method of claim 1, wherein the receiving of the fingerprint signal sensed by the second number of sensors in the first number of sensors comprises:
controlling the M scanning lines to transmit the driving signals to the sensors in rows one by one, and controlling the $n^{th}$, $(n+b)^{th}$, $(n+2b)^{th}$, ..., $(n+q*b)^{th}$ of the N receiving lines to receive the fingerprint signal sensed by the sensors in the corresponding row, when the $m^{th}$, $(m+a)^{th}$, $(m+2a)^{th}$, ..., $(m+p*a)^{th}$ of the M scanning lines are transmitting the driving signal to the sensors in a corresponding row,
where m, n, a, b, p and q are positive integers, and $a \geq 2$, $b \geq 2$, $m \geq 1$, $n \geq 1$, $p \geq 0$, $q \geq 0$, $m+p*a \leq M$ and $n+q*b \leq N$.

3. The method of claim 2, wherein the receiving of the fingerprint signal sensed by the second number of sensors among the first number of sensors comprises:
controlling the $m^{th}$, $(m+a)^{th}$, $(m+2a)^{th}$, ..., $(m+p*a)^{th}$ of the M scanning lines to transmit the driving signals to the sensors in the corresponding rows one by one.

4. The method of claim 1, wherein the receiving of the fingerprint signal sensed by the second number of sensors among the first number of sensors comprises:
controlling the M scanning lines to transmit the driving signals to the sensors in the corresponding rows one by one,
controlling the even-numbered receiving lines among the N receiving lines to receive the fingerprint signal sensed by the sensors in the corresponding row, when the odd-numbered scanning lines among the M scanning lines transmit the driving signal to the sensors in the corresponding row, and controlling the odd-numbered receiving lines among the N receiving lines to receive the fingerprint signal sensed by the sensors in the corresponding row, when the even-numbered scanning lines among the M scanning lines transmit the driving signal to the sensors in the corresponding row.

5. The method of claim 1, wherein the receiving of the fingerprint signal sensed by the second number of sensors among the first number of sensors comprises:
controlling the M scanning lines to transmit the driving signals to the sensors in the corresponding rows one by one,
controlling the odd-numbered receiving lines among the N receiving lines to receive the fingerprint signal sensed by the sensors in the corresponding row, when the odd-numbered scanning lines among the M scanning lines transmit the driving signal to the sensors in the corresponding row, and controlling the even-numbered receiving lines among the N receiving lines to receive the fingerprint signal sensed by the sensors in the corresponding row, when the even-numbered scanning lines among the M scanning lines transmit the driving signal to the sensors in the corresponding row.

6. A display panel of identifying fingerprints, comprising:
a first number of pixel units, arranged in a first direction and a second direction intersected with the first direction, and each pixel unit comprises a display element and a sensor configured to sense a fingerprint signal;
a receiving circuit, configured to receive a fingerprint signal sensed by the sensor;
a controller, configured to control the receiving circuit to receive the fingerprint signal sensed by a second number of sensors among a first number of sensors, in response to an instruction for fingerprint identification being received, wherein the second number is less than the first number, and
M scanning lines, connected to the sensors in M rows of the pixel units respectively and the M scanning lines configured to transmit a driving signal to the sensors,
wherein the receiving circuit comprise:
N receiving lines, connected to the sensors in N columns of pixel units respectively and the N receiving lines configured to receive the fingerprint signal sensed by the sensors,
wherein M and N are both integers greater than 1;
wherein any two of the second number of sensors are not adjacent to each other in the first direction and the second direction.

7. The display panel of claim 6, wherein the controller is configured to control the M scanning lines to transmit the driving signal to the sensors in rows one by one, in response to the instruction for fingerprint identification being received, and to control the $n^{th}$, $(n+b)^{th}$, $(n+2)^{th}$, . . . , $(n+q*b)^{th}$ of the N receiving lines to receive the fingerprint signal sensed by the sensors in the corresponding row, when the $m^{th}$, $(m+a)^{th}$, $(m+2a)^{th}$, . . . , $(m+p*a)^{th}$ of the M scanning lines are transmitting the driving signal to the sensors in a corresponding row,
wherein m, n, a, b, p and q are positive integers, and $a≥2$, $b≥2$, $m≥1$, $n≥1$, $p≥0$, $q≥0$, $m+p*a≤M$ and $n+q*b≤N$.

8. The display panel of claim 7, wherein the controller is configured to control the $m^{th}$, $(m+a)^{th}$, $(m+2a)^{th}$, . . . , $(m+p*a)^{th}$ of the M scanning lines to transmit the driving signal to the sensors in a corresponding row one by one, in response to the instruction for fingerprint identification being received.

9. The display panel of claim 6, wherein the controller is configured to control the M scanning lines to transmit the driving signal to the sensors in a corresponding row one by one, in response to the instruction for fingerprint identification being received, wherein the controller is further configured to:

control the even-numbered receiving lines among the N receiving lines to receive the fingerprint signal sensed by the sensors in the corresponding row, when the odd-numbered scanning lines among the M scanning lines transmit the driving signal to the sensors in the corresponding row, and control the odd-numbered receiving lines among the N receiving lines to receive the fingerprint signal sensed by the sensors in the corresponding row, when the even-numbered scanning lines among the M scanning lines transmit the driving signal to the sensors in the corresponding row.

10. The display panel of claim 6, wherein the sensor is a photoelectric sensor,
wherein the photoelectric sensor is configured to receive an incident light after the light being reflected by the ridge of a finger, and to determine the fingerprint information of the finger according to the intensity of the reflected light.

11. The display panel of claim 10, wherein the photoelectric sensor comprises:
a N-well on a silicon substrate;
wherein N + and P + are disposed on the N-well.

12. The display panel of claim 10, wherein the photoelectric sensor is connected with a switching unit in series.

13. The display panel of claim 6, wherein the display element is an organic electroluminescence display device.

14. A display apparatus comprising the display panel according to claim 6.

15. The display panel of claim 6, wherein the controller is configured to control the M scanning lines to transmit the driving signal to the sensors in a corresponding row one by one, in response to the instruction for fingerprint identification being received, wherein the controller is further configured to:
control the odd-numbered receiving lines among the N receiving lines to receive the fingerprint signal sensed by the sensors in the corresponding row, when the odd-numbered scanning lines among the M scanning lines transmit the driving signal to the sensors in the corresponding row, and control the even-numbered receiving lines among the N receiving lines to receive the fingerprint signal sensed by the sensors in the corresponding row, when the even-numbered scanning lines among the M scanning lines transmit the driving signal to the sensors in the corresponding row.

* * * * *